United States Patent [19]

Asaka et al.

[11] 3,982,507

[45] Sept. 28, 1976

[54] AFTERBURNING PREVENTION DEVICE FOR AN INTERNAL COMBUSTION ENGINE

[75] Inventors: Urataro Asaka, Kamifukuoka; Toru Hatanaka, Asaka; Katsuichi Shiroyama, Shiki, all of Japan

[73] Assignee: Honda Giken Kogyo Kabushiki Kaisha, Tokyo, Japan

[22] Filed: Dec. 10, 1974

[21] Appl. No.: 531,314

[30] Foreign Application Priority Data

Dec. 11, 1973    Japan.............................. 48-137360

[52] U.S. Cl............................ 123/97 B; 123/75 B; 123/119 D; 123/119 DB; 123/124 R; 123/124 B
[51] Int. Cl.².......................................... F02D 31/00
[58] Field of Search............ 123/97 B, 75 B, 32 ST, 123/119 D, 119 DB, 124 R, 124 B

[56] References Cited
UNITED STATES PATENTS

| | | |
|---|---|---|
| 2,733,696 | 2/1956 | Schneider......................... 123/97 B |
| 3,408,992 | 11/1968 | Von Seggern et al........... 123/32 ST |
| 3,418,981 | 12/1968 | Von Seggern et al........... 123/32 ST |
| 3,470,855 | 10/1969 | Von Seggern et al............ 123/97 B |
| 3,543,736 | 12/1970 | Suzuki et al..................... 123/32 ST |
| 3,830,205 | 9/1974 | Date et al........................ 123/32 ST |
| 3,842,810 | 10/1974 | Yagi et al........................ 123/32 ST |

Primary Examiner—Wendell E. Burns
Assistant Examiner—David D. Reynolds
Attorney, Agent, or Firm—Lyon and Lyon

[57] ABSTRACT

A three-valve prechamber internal combustion engine is provided with a conduit through which atmospheric air may be drawn into the intake passage leading to the prechamber. A solenoid valve in the conduit is opened during deceleration of the engine to lean-out any over-rich mixture and to remove any fuel droplets clinging to the walls of the auxiliary intake passage, thus preventing the temporary formation of an over-rich mixture which is not ignited by the spark plug. Such an over-rich mixture when exhausted into the exhaust passage contacts the hot portions thereof to be explosively ignited to produce the undesirable afterburning phenomenon.

4 Claims, 1 Drawing Figure

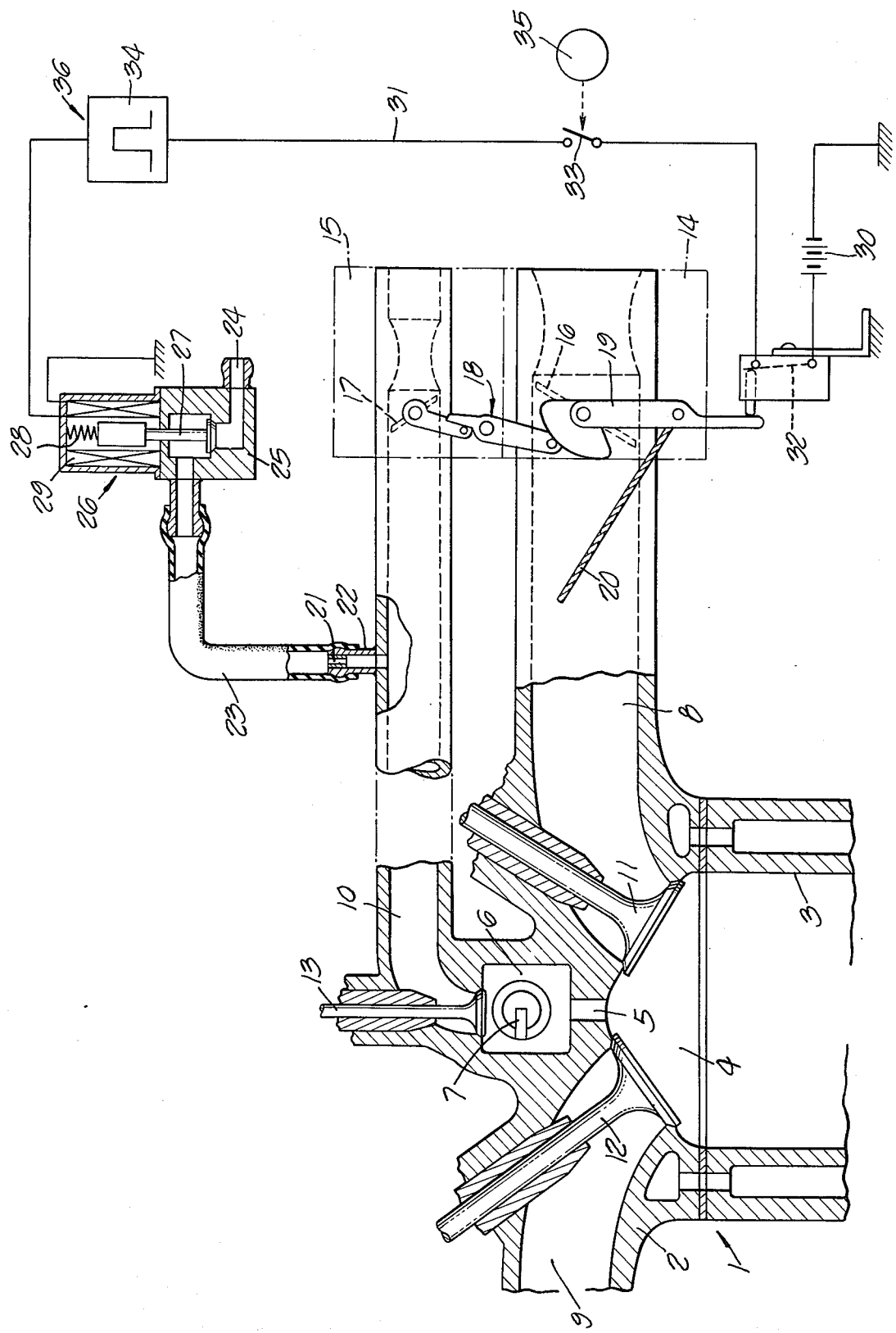

AFTERBURNING PREVENTION DEVICE FOR AN INTERNAL COMBUSTION ENGINE

This invention relates to three-valve prechamber internal combustion piston engines, and is particularly directed to improvements in such engines to prevent undesirable afterburning when the engine decelerates.

Internal combustion piston engines of the type described have a main combustion chamber for each cylinder. Each main combustion chamber is connected to an auxiliary combustion chamber through a torch opening. A lean mixture is supplied by a first carburetor to the main combustion chamber, and a rich mixture is supplied by an auxiliary carburetor to the auxiliary combustion chamber. At the end of the compression stroke, a spark plug ignites the mixture in the auxiliary combustion chamber and this causes a flame to project through the torch opening to ignite the lean mixture in the main combustion chamber. The total air-fuel ratio supplied to the engine is leaner than stoichiometric.

Since the rich mixture contacts the interior walls of the auxiliary intake passage leading to the auxiliary combustion chamber, a comparatively large amount of fuel may cling to the walls during normal operation, and this clinging fuel may be forced into the auxiliary combustion chamber by the sudden increase in the intake vacuum when the engine is decelerated. The result is that an over-rich mixture is temporarily created which cannot be electrically ignited, and a misfire is produced. When this unburned mixture passes into the exhaust passage, it contacts the hot parts inside the exhaust passage and is explosively ignited, and the afterburning phenomenon occurs.

A similar phenomenon is known to occur in conventional type internal combustion spark ignition piston engines, which do not employ a prechamber or a third valve. To remedy the afterburning problem in such conventional engines, a vacuum pressure responsive valve is provided which opens the intake passage to atmosphere when the intake vacuum becomes excessive. In this way the production of over-rich mixture at the time of engine deceleration is prevented. The same solution to the problem, however, was found to be ineffective when applied to a three-valve prechamber engine because the absolute quantity of intake air to the auxiliary combustion chamber is too small to be suitably corrected and also because of the inherent error of the secondary air supply timing produced by the response pressure error of the vacuum pressure responsive valve.

The present invention overcomes this difficulty and prevents the afterburning phenomenon by accurately correcting the richness of the prechamber mixture to a value that can be electrically ignited. This is accomplished by supplying secondary air to the auxiliary intake passage for only the time period at which the mixture in the auxiliary combustion chamber becomes over-rich, during engine deceleration.

Other objects and advantages will appear hereinafter.

The drawing is a side elevation partly in section and partly in diagrammatic form showing a preferred embodiment of this invention.

Referring to the drawing, the internal combustion engine 1 has a cylinder head 2 which cooperates with each cylinder 3 to form a main combustion chamber 4 above the piston. An opening 5 connects the auxiliary combustion chamber 6 to the main combustion chamber 4. A spark plug 7 is positioned to ignite the mixture in the auxiliary combustion chamber 6. A main intake passage 8 delivers a lean air-fuel mixture to the main combustion chamber 4 through the main intake valve 11, and exhaust gases are discharged from that chamber through the exhaust passage 9 and exhaust valve 12. A rich mixture is supplied through the auxiliary intake passage 10 to the auxiliary chamber 6 through the auxiliary intake valve 13. Conventional valve actuating mechanism (not shown) is provided for timed operation of the valves 11, 12 and 13. A main carburetor 14 is provided for supplying the lean mixture to the main intake passage 8, and the auxiliary carburetor 15 is provided to supply a rich mixture through the auxiliary intake passage 10.

The main throttle valve 16 of the main carburetor 14 and the auxiliary throttle valve 17 of the auxiliary carburetor 15 are operated in unison by means of the coordinating linkage 18. The throttle wire 20 is connected to the accelerator pedal (not shown) and is connected to the operating lever 19 of the main throttle valve 16. Movement of the wire 20 serves to operate both throttle valves at the same time.

In accordance with this invention, a secondary air intake pipe 22 having an orifice 21 is connected to the auxiliary intake passage 10 downstream from the auxiliary throttle valve 17. A conduit 23 connects the pipe 22 to the body 25 of a solenoid valve assembly 26. A passage 24 from the body 25 leads to atmospheric air. When the valve 27 is open, atmospheric air may be drawn in through the passage 24 and through the interior of the body 25, conduit 23, orifice 21 and pipe 22 into the auxiliary passageway 10. A spring 28 is provided to close the valve 27, and a solenoid coil 29 is provided for lifting the valve 27 against the action of the spring 28.

In the electrical circuit 31 which connects the solenoid coil 29 to the power source 30, there are provided primary and secondary control switches 32 and 33 connected in series. Also connected in series with the control switches is a monostable multivibrator 34 which, upon receiving an input signal, generates output current instantly for a predetermined time interval. The primary control switch 32 is closed by the operating lever 19 at the idle position of the main throttle valve 16. The secondary control switch 33 is closed by the engine speed detector 35 which, for example, may take the form of a predetermined high speed signal from a tachogenerator coupled to the engine. Accordingly, the monostable multivibrator 34 coacts with the primary and secondary control switches 32 and 33 to form an electrical circuit with the timer 36 and solenoid coil 29 for a predetermined time interval when the main throttle valve 16 is returned to idle position during high speed operation of the engine. The predetermined time corresponds to the time during which the over-rich mixture is produced inside the auxiliary combustion chamber 6 during engine deceleration. As an example, the time period set may be a value between 0.2 and 0.4 seconds from the instant of commencement of deceleration.

The general plan of operation is as follows. During the suction stroke of the piston, a lean mixture is delivered by the main carburetor 14 and a rich mixture is delivered by the auxiliary carburetor 15, and these mixtures are introduced into the main combustion chamber 4 and the auxiliary combustion chamber 6, respectively, through the main and auxiliary intake passages 8 and 10. During the compression stroke of the piston, the rich mixture in the auxiliary combustion chamber 6 is diluted by lean mixture entering from the main combustion chamber 4 through the torch opening 5. This produces an air-fuel mixture that is readily ignited by the spark plug 7 at the end of the compression stroke. A flame then passes from the auxiliary chamber through the torch opening into the main combustion chamber 4 to ignite the lean mixture. The overall mixture supplied to the engine is leaner than the stoichiometric ratio.

At high speed and high power operation of the engine, the primary control switch 32 remains open. If the main and auxiliary throttle valves 16 and 17 are closed suddenly to decelerate the engine, the primary control switch 32 will also be closed, thereby triggering the monostable multivibrator 34 to generate output current for the predetermined time. This actuates the solenoid coil 29, thereby opening the poppet valve 27. Atmospheric air enters the secondary air conduit 23, is metered through the orifice 21 and enters the auxiliary intake passage 10. The supply of atmospheric air is limited to the period corresponding to that in which an over-rich mixture is produced in the auxiliary combustion chamber 6, and therefore only the over-rich mixture is diluted with the additional air. Misfiring at the auxiliary combustion chamber 6 is prevented.

At idling or low speed operation of the engine, the secondary control switch 33 remains open and the input signal is not given to the monostable multivibrator 34, with the result that the solenoid valve assembly 26 is held in the closed position, even though the primary control switch 32 may be opened and closed by operation of the main and auxiliary throttle valves 16 and 17.

In accordance with this invention, secondary air is supplied to the auxiliary intake passage 10, and the duration of its supply is accurately matched to the period over which an over-rich mixture is produced in the auxiliary combustion chamber 6 when the engine is decelerated. Therefore, since the secondary air dilutes only the over-rich mixture and does not have the same action on the mixture in the main chamber 4, the mixture in the auxiliary chamber 6 is maintained at a suitable air-fuel ratio during deceleration to secure proper ignition in the auxiliary chamber, accompanied by proper flame torch ignition for the lean mixture in the main combustion chamber 4. In this way, the undesirable afterburning phenomenon is prevented.

Having fully described our invention, it is to be understood that our invention is not limited to the details herein set forth, but that our invention is of the full scope of the appended claims.

We claim:

1. In an internal combustion spark ignition piston engine having a main combustion chamber and an auxiliary combustion chamber connected by a torch opening, the improvement comprising, in combination: means including a main intake passage for supplying a lean mixture to the main combustion chamber, a throttle valve in said passage, means including an auxiliary intake passage for supplying a rich mixture to the auxiliary chamber, a conduit for supplying atmospheric air to said auxiliary intake passage, a valve adapted to close said conduit, means for operating said valve to open said conduit, said means including a first device responsive to movement of said throttle valve toward closed position, said means also including a second device sensitive to speed of the engine, said first device including timing means, whereby said valve is opened for a timed interval when the throttle valve moves toward closed position while the engine speed is above a predetermined value.

2. In an internal combustion spark ignition piston engine having a main combustion chamber and an auxiliary combustion chamber connected by a torch opening, the improvement comprising, in combination: means including a main intake passage for supplying a lean mixture to the main combustion chamber, a throttle valve in said passage, means including an auxiliary intake passage for supplying a rich mixture to the auxiliary chamber, a conduit for supplying atmospheric air to said auxiliary intake passage, a solenoid-operated valve adapted to close said conduit, an electrical circuit for energizing the solenoid valve to open said conduit, timing means in said circuit, a first switch in said circuit closing upon movement of said throttle valve toward closed position, a second switch in said circuit sensitive to speed of the engine and closing when the engine speed exceeds a predetermined value, the switches being connected in series, whereby said valve is opened for a timed interval when the throttle valve moves toward closed position while the engine speed is above a predetermined value.

3. In an internal combustion spark ignition piston engine having a main combustion chamber and an auxiliary combustion chamber connected by a torch opening, the improvement comprising, in combination: means including a main intake passage for supplying a lean mixture to the main combustion chamber, a throttle valve in said passage, means including an auxiliary intake passage for supplying a rich mixture to the auxiliary chamber, means including a conduit for supplying atmospheric air to said auxiliary intake passage, said means including a solenoid-operated valve adapted to close said conduit, an electrical circuit for energizing the solenoid valve to open said conduit, a first switch in said circuit closing upon movement of said throttle valve toward closed position, a second switch in said circuit sensitive to speed of the engine and closing when the engine speed exceeds a predetermined value, the switches being connected in series, and a timer connected in series with said switches to hold the solenoid-operated valve open for a predetermined time interval.

4. In an internal combustion spark ignition piston engine having a main combustion chamber and an auxiliary combustion chamber connected by a torch opening, the improvement comprising, in combination: means including a main intake passage for supplying a lean mixture to the main combustion chamber, a throttle valve in said passage, means including an auxiliary intake passage for supplying a rich mixture to the auxiliary chamber, means including a conduit for supplying atmospheric air to said auxiliary intake passage, said means including a solenoid-operated valve adapted to close said conduit, an electrical circuit for energizing the solenoid valve to open said conduit, a first switch in said circuit closing upon movement of said throttle valve toward closed position, a second switch in said circuit sensitive to speed of the engine and closing when the engine speed exceeds a predetermined value, the switches being connected in series, and a timer connected in series with said switches to hold the solenoid-operated valve open for a predetermined time interval, the timer comprising a monostable multivibrator.

* * * * *